United States Patent Office 3,482,778
Patented Dec. 9, 1969

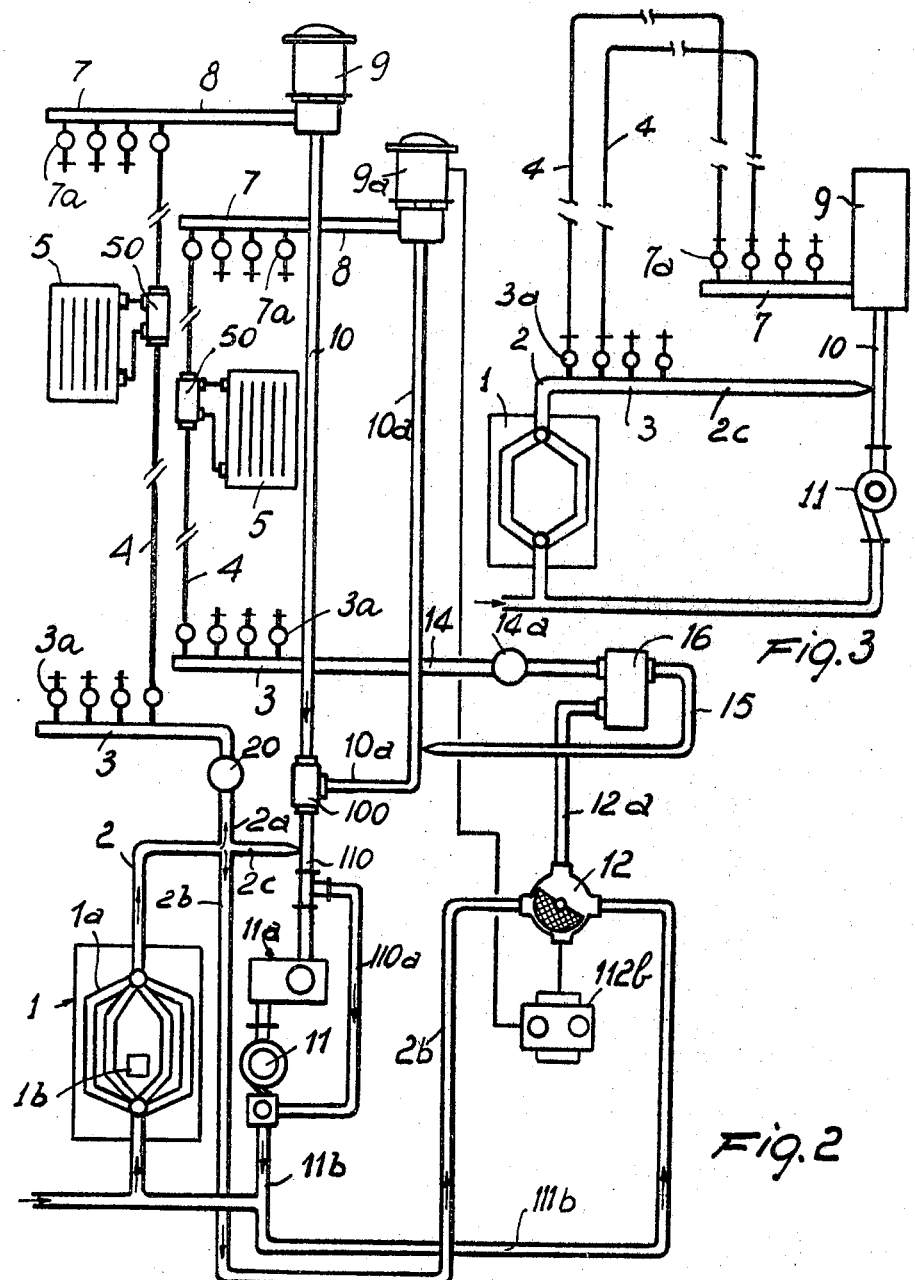

3,482,778
HEATING PLANT
Gianluigi Lanzoni, Via Civitali 13, Milan, Italy
Filed Nov. 13, 1967, Ser. No. 682,031
Claims priority, application Italy, Nov. 19, 1966,
30,178/66
Int. Cl. F24d 3/02
U.S. Cl. 237—8                                      3 Claims

ABSTRACT OF THE DISCLOSURE

A heating plant comprising a heater, a hot fluid delivery duct, a fluid return duct, a plurality of columns connected in parallel between said delivery and return ducts and carrying a plurality of heating elements, said columns being provided with flow adjusting means grouped in a single common zone or place.

BACKGROUND OF THE INVENTION

This invention relates to a multi-columned heating plant or system utilizing a fluid as a heat conveyor.

In buildings of medium or large size, as well as blocks of buildings with a common heat plant, heating systems are known which comprise a heating unit feeding a plurality of columns distributed in the building in order to create the desired thermic conditions in every part of the building. Each of said columns usually has a plurality of heating elements in series. Upper sections of the columns are inter-connected by a duct which, starting from one of the columns, successively collects the fluid emanating from the successive columns and discharges into a container or expansion tank, from whence the fluid is conveyed for re-admission into the heating unit. At the upper end of each column adjustment means are usually provided which are designed to adjust the thermic conditions corresponding to each column in relation to fluctuations of the characteristic parameters which affect the thermic balance of the system. It is evident that any adjustment effected on one of the columns may affect the conditions of the remaining columns and it is consequently necessary in such cases, to perform a series of corrections to the various columns in order to ascertain the best equilibrium point. It is also evident that if the columns are distributed throughout the building, and especially when the building is of large size, the operator detailed to the adjustment must move from one column to another and, possibly, from one wing of the building to another in order to reach the adjustment members. Such an operation may consequently involve a remarkable amount of work on the part of the operator especially while effecting general test and there is always the possibility that the characteristic parameters of the system may change during his movements from one column to another and thus requires a new adjustment based on the changed parameters.

The main object of this invention is that of providing a multi-columned heating plant wherein an immediate and ready adjustment of the thermic characteristics of the single columns may be effected.

Another object of this invention is that of providing a multi-columned heating plant which does not involve an increase in the loss of pressure along the fluid circuit with respect to known types.

Another object of this invention is that of providing a multi-columned heating plant which does not include parts of difficult manufacture or complicated maintenance.

Another object of this invention is that of providing a heating plant of safe and reliable working and high efficiency.

SUMMARY OF THE INVENTION

These and other objects, which will appear more clearly hereinafter, are achieved by a heating plant comprising a heater unit, a plurality of columns, a delivery duct between said heater unit and said columns, a plurality of series arrangements of heating elements arranged on said columns, a return duct between said columns and said heater unit, an expansion tank in said return duct and pump means between said expansion tank and said heater unit, characterized in that the upper ends of said columns open into a common collector member, connected to said expansion member and having inner dimensions substantially greater than the inner dimensions of said columns, means being provided near said collector member for the regulation of the thermic and hydraulic conditions of said columns.

BRIEF DESCRIPTION OF THE DRAWINGS

Further characteristics and advantages will appear more clearly from the following detailed description of a multi-columned heating plant according to the invention illustrated by way of non-limiting example in the accompanying drawing, in which:

FIGS. 2 and 3 show in more detail two embodiments of the invention.

DESCRIPTION OF THE PREFERRED EMBODIMENTS

Figure 1:
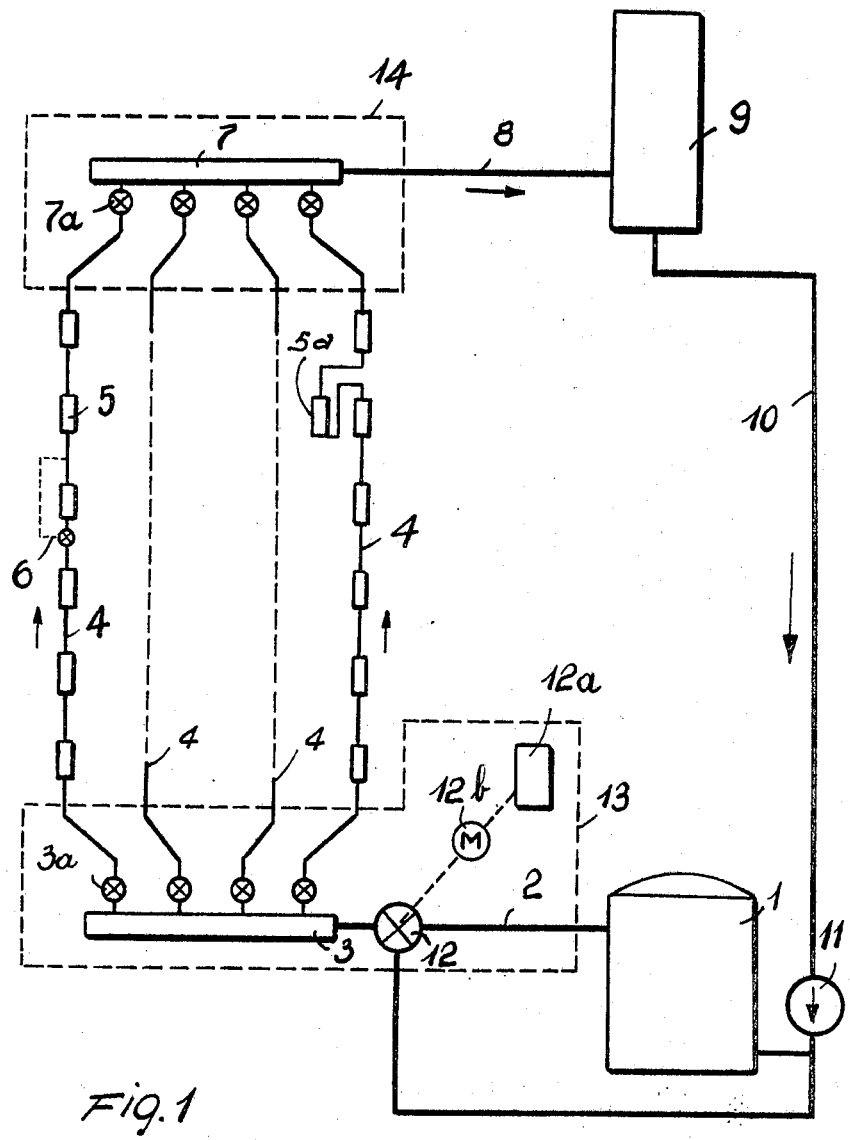
FIG. 1 is a diagrammatic view of a heating plant according to the invention.

With reference to FIG. 1, the heating plant according to the invention comprises a central heating unit 1 formed, for example, by a burner and a boiler, a hot water delivery pipe 2 connected to said heating unit 1. Said delivery pipe 2 discharges into a lower container like manifold 3 connected to a plurality of columns 4. On said columns 4 heating elements 5 are inserted in series and may also be arranged in the same plane such as in a floor. Advantageously shutter or interception means 6 are provided in parallel to said heating elements 5 to enable by-passing of elements 5. The upper ends of said columns flow into a collector or upper container like manifold 7. An end of the container 7 is connected, by means of a common union 8, to an expansion tank 9. A thermo-expansion condenser may be interposed in this latter connection. A return pipe 10, connected at one end to said expansion tank 9, closes the circuit through a pump system 11.

Adjustment and interception members 3a and 7a for the single columns are situated at said manifolds 3 and 7, respectively, and are thus grouped in two single zones 13 and 14 (enclosed in dotted lines) so as to enable an immediate and almost simultaneous inter-adjustment of the single columns.

The adjustment zone 13 advantageously also includes a three-way valve 12 inserted in the circuit. By means of the valve 12 it is possible to introduce cold water into the columns 4 and, by suitable shutter action of the valve 12 controlled by a control unit 12a and by means of a servomotor 12b it is possible to regulate the hot water flow to the columns.

Further, in the case in which the heating plant is adapted for use in a plurality of buildings, each building may be provided with its own adjustment zones or centers 13 and 14.

Because of the considerable difference existing between the internal diameter of the single distributor tubes (columns 4) and the manifolds or collectors 3 and 7 the loss of pressure in the circuit is minimal. In other words the pressure in any given point of the circuit between the collector 3 and the collector 7 will not substantially differ from the initial pump pressure. This fact means that the fluid, in its passage through the circuit, can pass through considerable changes of level and makes it possible to overcome the inertia which is characteristic of some siphon radiators such, for example, as that diagrammatically indicated by 5a in FIG. 1. There also results the advantageous expulsion of the air present in the circuit and of air which may be developed during the heating of the fluid (more particularly water) and thus a stable continuous flow of fluid is obtained in said circuit. The internal diameter of the tubes or columns 4 preferably lies within the limits of 8 to 20 mm. with a fluid pressure of 0.5 to 2 kg./cm.$^2$ respectively, dependently also on the heating fluid employed in the circuit and on the temperature which it is desired to reach inside the tubes. The internal diameter of the collectors 3 and 7 may exceed 10 cm.

FIGS. 2 and 3 (in which analogous members retain the same reference numeral as in FIG. 1) show two different embodiments of a heating plant according to the invention.

FIG. 2 diagrammatically shows a heating plant comprising a heating unit 1 constituted by a boiler 1a and a burner 1b. From the unit 1 extends a hot water supply pipe 2 which trifurcates into three separate branches 2a, 2b and 2c. The branch 2a, through a control valve 20, carries the water to a collector 3 which is connected to a collector 7 by means of a plurality of columns 4 which are arranged in parallel with respect to said collectors 3 and 7.

In the columns 4 are arranged a series of radiator elements 5, provided with a multi-way valve device 50 of the type described in my pending patent application No. 644,676 filed on June 8, 1967. The upper collector 7, through a tube 8, is in connection with an expansion tank 9 which is normally in free communication with the atmosphere. A tube 10 extends from the tank 9 and conveys the fluid to a mixer 100 which, via a tube 110, feeds the pump 11. Between the pump 11 and the mixer 100 is provided a filter and control unit or device 11a of commercially available type. Moreover the pump 11 is provided with a bypass pipe 110a. A pipe 11b conducts the fluid under pressure from the pump partly to the heating unit 1 and partly through a pipe 111b to a three-way valve 12.

Said valve 12 also receives the fluid fed by the branch 2b of the pipe 2. The valve 12 is controlled by a control unit, generally indicated by 112b, of a commercially available type such as, for example, that sold by the Minneapolis-Honeywell Regulator Co., Minneapolis, Minn.

Through a pipe 12a the fluid from the valve 12 is carried to a mixer 16 which communicates with pipes 14 and 15. Through said pipe 14 and a control valve 14a the fluid is fed to a further collector 3 and then caused to pass to columns 4, the radiators 5, the upper collector 7, the pipe 8 and the expansion tank 9a. The tank 9a (and other possible tanks of the same type provided for other possible circuit branches) is arranged at a level lower than that of the tank 9 and it is not usually in communication with the atmosphere.

From the tank 9a, through the pipe 10a the fluid contained in the tank 9a is conveyed to the mixer 100.

Naturally each circuit which affects a heating element 5 arranged in series on a column 4 may be developed also in vertical or horizontal direction in order to affect a particular part of the building. It should also be noted that the various pipes and tubes in communication with a collector 3 may also feed one or more lines at different levels. Between the collector 3 and the return pipe 10a or 110 is provided a regulated or controllable connection 2c and 15, respectively, allowing a portion of fluid coming from delivery pipe 2 to flow directly into the return pipes 110 and 10a respectively and having the following results:

Makes possible the total expulsion of air from the collector 3 in the case in which its connections are arranged to extend downwardly;

The mixing of a limited quantity of outlet water in the return circulation with the object of bringing the water which arrives at the filter regulation device 11a to almost the same temperature as exists in the expansion tank in the filter 9 or 9a. This naturally involves suitably adjusting the flow of fluid which passes through such regulated connection in manner such that the temperature of the water in the device 11a be the same as the water in the tank 9 when the latter, as in FIG. 2, is arranged in the upper part of the building to be heated;

Serves for overflow of possible small quantities of vapour formed at the exit of the heating unit 1 as a result of an accidental loss of electrical energy (halt of the pump) or the like;

If the general circulation should be interrupted as a result of an accidental lowering of the level of the fluid in circulation, the limited quantity of fluid at high temperature in the pipe 110 and sensed by the device 11a, causes the immediate lacking of the system (stop of the boiler) on the part of the control device 11a.

FIG. 3 diagrammatically shows a heating plant for small buildings. Exploiting the favourable relationship between the internal diameters of said collectors 3 and 7 and the columns 4, the expansion tank 9 may be grouped in a single zone, for instance arranged near the boiler (in the same room). In fact one may overcome considerable differences of level up to 8 m. or more in the outlet circuit in arrival at the tank 9 even when, as is generally the case, said tank 9 is in direct atmosphere connection.

It has been ascertained in practice that the heating plant according to the invention fully achieves the pre-determined objects and, in particular, permits an immediate and ready access to the adjustment or regulation members situated at the ends of the single columns.

The invention may be subject to various modifications and variations within the scope of the appended claims.

In practice the materials used as well as the dimensions may be varied according to the requirements of use.

I claim:

1. A heating system comprising a heater unit, a plurality of columns, a delivery duct between said heater unit and said columns, a plurality of series arrangements of heating elements arranged on said columns, a return duct between said columns and said heater unit, an expansion tank in said return duct and pump means between said expansion tank and said heater unit, an upper manifold pipe member into which the upper ends of said columns open and connected to said expansion tank and a lower manifold pipe member into which the lower ends of said columns open and connected to said heater unit, and wherein according to the improvement, the system further comprises means (3a, 7a) arranged near said lower and upper manifold pipe members (3, 7) for the regulation of the thermic and hydraulic conditions of said columns (4) and a controllable connection (2c) between said delivery duct and said return duct (10, 10a) and wherein said lower and upper manifold pipe members and said means for the regulation of the thermic and hydraulic conditions of said columns are grouped in a single zone, and wherein said manifold pipe members have over their entire length a cross-sectional passage area which is substantially greater than the cross-sectional passage area of said columns.

2. A heating system according to claim 1, wherein said controllable connection comprises at least one pipe (2c, 2b, 15) branching from said delivery duct (2) and leading towards said return duct (10, 10a) and valve means (12) controlling the flow therethrough.

3. A heating system according to claim 1, wherein the ratio of the cross-sectional passage area of said manifold pipe members to the cross-sectional passage area of said columns is greater than 10.

References Cited
UNITED STATES PATENTS

| | | | |
|---|---|---|---|
| 996,129 | 6/1911 | Peck | 237—63 |
| 1,640,629 | 8/1927 | Van Der Woude | 237—63 |
| 2,211,573 | 8/1940 | McGrath | 237—8 |
| 3,792,181 | 5/1957 | Cialente | 237—63 |

EDWARD J. MICHAEL, Primary Examiner

237—63